(12) United States Patent
Bowra et al.

(10) Patent No.: US 7,844,723 B2
(45) Date of Patent: Nov. 30, 2010

(54) LIVE CONTENT STREAMING USING FILE-CENTRIC MEDIA PROTOCOLS

(75) Inventors: Todd Bowra, Redmond, WA (US); Nicholas Fang, Redmond, WA (US); Ashley Speicher, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 443 days.

(21) Appl. No.: 11/706,624

(22) Filed: Feb. 13, 2007

(65) Prior Publication Data

US 2008/0195746 A1    Aug. 14, 2008

(51) Int. Cl.
*G06F 15/16* (2006.01)
(52) U.S. Cl. .................. 709/231; 709/230; 709/232
(58) Field of Classification Search .................. 709/231
See application file for complete search history.

(56) References Cited

U.S. PATENT DOCUMENTS

| | | | |
|---|---|---|---|
| 6,857,130 B2 | 2/2005 | Srikantan et al. | |
| 6,970,937 B1 | 11/2005 | Huntington | |
| 7,073,191 B2 | 7/2006 | Srikantan et al. | |
| 2002/0023165 A1 | 2/2002 | Lahr | |
| 2004/0073596 A1 | 4/2004 | Kloninger et al. | |
| 2004/0078817 A1* | 4/2004 | Horowitz et al. | 725/58 |
| 2004/0098748 A1 | 5/2004 | Bo et al. | |
| 2004/0107449 A1* | 6/2004 | Fukuda et al. | 725/135 |
| 2004/0125757 A1 | 7/2004 | Mela et al. | |
| 2004/0215802 A1 | 10/2004 | Amini et al. | |
| 2005/0114896 A1* | 5/2005 | Hug et al. | 725/88 |
| 2005/0238057 A1* | 10/2005 | Toma et al. | 370/503 |
| 2006/0056336 A1* | 3/2006 | Dacosta | 370/328 |
| 2006/0087458 A1* | 4/2006 | Rodigast et al. | 341/50 |
| 2007/0186246 A1* | 8/2007 | Goldhor | 725/46 |

FOREIGN PATENT DOCUMENTS

| | | |
|---|---|---|
| WO | WO0122682 A3 | 3/2001 |
| WO | WO2004040874 A1 | 5/2004 |

OTHER PUBLICATIONS

"QuickTime Streaming", http://images.apple.com/quicktime/streamingserver/QT_Streaming_TB.pdf, Feb. 13, 2007.
Macek et al., "Improving multimedia content delivery in carnet media on demand", Date: 2002, http://mod.carnet.hr/docs/radovi/carnet/cuc2002.pdf, Feb. 13, 2007.
Simone, Leggio, "Streaming Media over the Internet with the Real Time Streaming Protocol", http://www.cs.helsinki.fi/u/jmanner/Courses/seminar_papers/rtsp.pdf, Feb. 13, 2007.

* cited by examiner

*Primary Examiner*—Jeffrey Pwu
*Assistant Examiner*—Shaq Taha

(57) ABSTRACT

Described herein is technology for, among other uses, performing playback of dynamic content using protocols designed for playback of fixed-length files. The technology involves strategically updating the duration of the content during playback under various conditions. During playback, as the playback position approaches the duration, the duration is refreshed. Also, during playback the rate at which the duration is increasing is used to predict the duration and thus smoothly report the duration to the user. Upon receiving a seek request, if the request is beyond the current duration, the duration will be refreshed to avoid unnecessarily limiting the seek request.

20 Claims, 8 Drawing Sheets

LIVE CONTENT STREAMING USING FILE-CENTRIC MEDIA PROTOCOLS

BACKGROUND

Computer networks couple various types of computer systems in a manner that enables the network coupled computer systems to access data from a variety of sources of information. Some computer networks allow media content to be streamed from one or more network coupled sources of media content to one or more network coupled receivers of media content. In such computer networks, media content can be streamed by media content servers and played back by media content playback systems that are associated with the media content receivers.

The multitude of network devices often results in various pieces of content being located on a plurality of different devices. In a home network for example, there may be multiple personal video recorders (PVR), computers, and set top boxes, each with different content. The ability for a user to conveniently use a single device to access content from various devices on the network is highly desirable. Thus, in order to ensure a good user experience, the playback experience of the user should be near or the same as the playback experience as if the user was at the device which holds the desired content.

Various groups have worked toward the standardization of new protocols for file distribution in home networks. These standards have focused primarily on file based or file-centric content, including movies, recorded TV shows, home videos, and music files. Thus, the standards are well suited for the access of static or unchanging files.

Each device throughout the network may have varying protocol and playback support. This variation in support increases the chance that a device or client requesting content will not support certain protocols or be able to play back content in its current format. For example, a file may be encoded in the MPEG-4 format but the requesting device may only support playback of MPEG-2. Therefore, to allow playback on the requesting device, the device hosting the data or host may need to convert the file to a new format for playback on the requesting device.

As the original file, which contains the content in the original format, is converted to a new format, it may be streamed to the requesting device in realtime. During the conversion, the converted file, containing the converted content), will be getting larger as more of the file is converted to the new format. Correspondingly, the duration of the converted file increases as more of the file is converted to the new format.

Under the current standards the current file duration will only be transmitted at the beginning of streaming to the client device. Thus, when the client device starts to play the content being converted by playing the converted file, the playback will be based on information initially received about the duration, which will be based on the amount of the content successfully converted to that point. Upon reaching said file duration, the playback program will initiate end of stream (EOS) procedures which, among other things, include freeing up memory and network resources. Thus, if the playback device initiates EOS procedures based on the initially received duration at the start of playback, the playback may end well before the end of the content in the original file has been reached because the content is still being converted.

This duration issue may also arise in the case where a file is being downloaded, streamed, or broadcast to the host computer and the user wishes to view the file on another device. Furthermore, that content may be in a format that is supported by the host but not the client device. For example, content may be broadcast to the host as part of an Internet Protocol Television (IPTV) stream-encoded using the MPEG-4 format but the client device may not support the playback of an MPEG-4 stream. In this case, the content will require conversion prior to playback on the requesting device. In each case, the host may stream the content to the client device as the host receives it in the original or a different format. Again, only the initial length of the piece of content being converted may be provided at the beginning of streaming to the client device. Therefore, the playback device may initiate EOS procedures prematurely based on said initial duration.

SUMMARY

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

Described herein is technology for, among other things, performing playback of dynamic content using protocols designed for playing fixed-length files. Dynamic content is content that is live or whose length is otherwise increasing, especially in reference to content that is currently being played. Live content may be content that is coming from a broadcast-style source which is delivering the content in realtime. In one embodiment, dynamic content may refer to content that is stored in a dynamic file whose length is growing. The technology may be implemented via a remote playback device on a home network. It involves strategically updating the duration of the content during playback under various conditions. During playback, the current playback position is monitored as compared to the currently known duration. As the playback position approaches the duration, the duration is refreshed to avoid prematurely stopping and ending playback.

Upon the receipt of a seek request or request to change the playback position in a piece of content, the seek request may be checked to see if it is a request to move to a position beyond the currently known duration. If the request is beyond the current duration, the duration may be refreshed prior to performing the seek to avoid unnecessarily limiting the seek request.

Additionally, during playback, the rate at which the file is increasing may be monitored and a prediction made based on the rate of increase. This prediction may then be used to smoothly report the anticipated changes in duration to the user.

Thus, embodiments provide technology for performing playback of dynamic content using protocols designed for playback of fixed-length files. The techniques described herein provide for smooth playback of dynamic content and/or files. Among other uses, such technology is ideal for playback on devices with limited support of protocols and playback formats. Because of the techniques of the technology described herein, it is possible to enable high quality playback experiences of content on devices that would otherwise not be able to play the content.

BRIEF DESCRIPTION OF THE DRAWINGS

The accompanying drawings, which are incorporated in and form a part of this specification, illustrate embodiments and, together with the description, serve to explain their principles.

DETAILED DESCRIPTION

Figure 1:
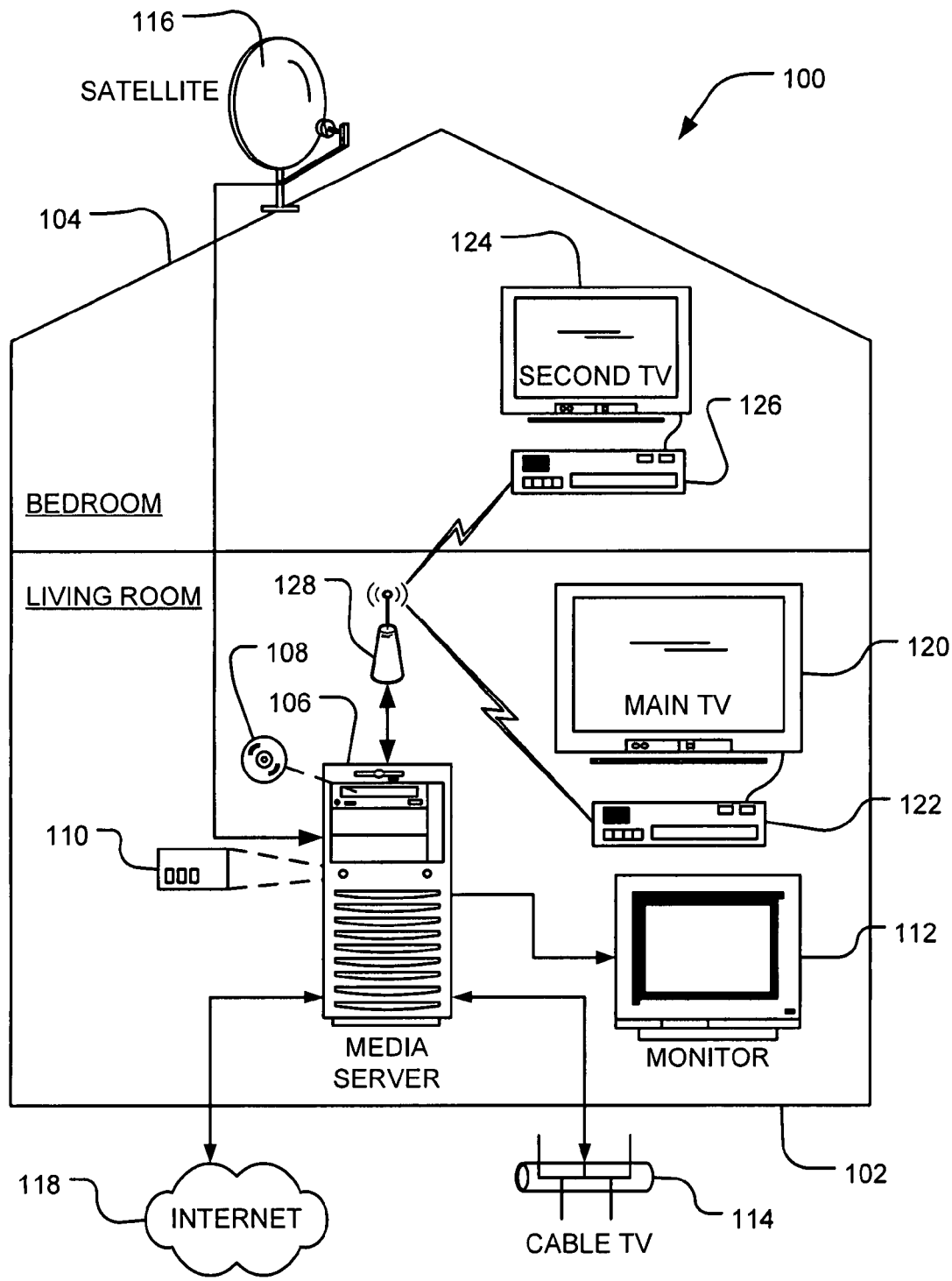
FIG. 1 shows a home entertainment operating environment according to one embodiment.

Reference will now be made in detail to the preferred embodiments of the claimed subject matter, examples of which are illustrated in the accompanying drawings. While the invention will be described in conjunction with the preferred embodiments, it will be understood that they are not intended to limit the claimed subject matter to these embodiments. On the contrary, the claimed subject matter is intended to cover alternatives, modifications and equivalents, which may be included within the spirit and scope of the claimed subject matter as defined by the claims. Furthermore, in the detailed description of the present invention, numerous specific details are set forth in order to provide a thorough understanding of the claimed subject matter. However, it will be obvious to one of ordinary skill in the art that the claimed subject matter may be practiced without these specific details. In other instances, well known methods, procedures, components, and circuits have not been described in detail as not to unnecessarily obscure aspects of the claimed subject matter.

Some portions of the detailed descriptions that follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the claimed subject matter.

It should be borne in mind, however, that all of these terms are to be interpreted as referencing physical manipulations and quantities and are merely convenient labels and are to be interpreted further in view of terms commonly used in the art. Unless specifically stated otherwise as apparent from the discussion herein, it is understood that throughout discussions of the present embodiment, discussions utilizing terms such as "determining" or "outputting" or "transmitting" or "recording" or "locating" or "storing" or "displaying" or "receiving" or "recognizing" or "utilizing" or "generating" or "providing" or "accessing" or "checking" or "notifying" or "delivering" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

Described herein is technology for, among other things, performing playback of live content or content of increasing length using protocols designed for playing fixed-length files. Dynamic content is content that is live or whose length is otherwise increasing, especially in reference to content that is currently being played. In one embodiment, dynamic content may refer to content that is stored in a dynamic file whose length is growing. The technology may be implemented via a remote playback device on a home network. It involves strategically updating the duration of the content during playback under various conditions. During playback, the current playback position is monitored as compared to the currently known duration. As the playback position approaches the duration, the duration is refreshed to avoid prematurely stopping and ending playback.

Upon the receipt of a seek request, the seek request may be checked to see if it is a request to move to a position beyond the currently known duration. If the request is beyond the current duration, the duration may be refreshed prior to performing the seek to avoid unnecessarily limiting the seek request.

Additionally, during playback, the rate at which the content is increasing may be monitored and a prediction made based on the rate of increase. This prediction may then be used to smoothly report the anticipated changes in duration to the user.

Thus, embodiments provide technology for performing playback of dynamic content using protocols designed for playback of fixed-length files. The techniques described herein provide for smooth playback of dynamic content. Among other uses, such technology is ideal for playback on devices with limited support of protocols and playback formats. Because of the techniques of the technology described herein, it is possible to enable high quality playback experiences of content on devices that would otherwise not be able to play the content.

FIG. 1 shows an exemplary home operating environment according to one embodiment. In a home entertainment operating environment 100 such as is shown in FIG. 1, media receivers 122 and 126 can be placed in communication with media server 106 through network 128 (for example a local area network (LAN)). In an exemplary embodiment, the media receivers 122, 126 can be Media Center Extender devices, for example, an Xbox 360™ (Microsoft Corporation, Redmond, Wash.).

In addition to the aforementioned Media Center Extender devices, media receivers 122 and 126 can also include a variety of conventional media rendering or computing devices, including, for example, a set-top box, a television, a video gaming console, a desktop PC, a notebook or portable computer, a workstation, a mainframe computer, an Internet appliance, a handheld PC, a Digital Audio Player (DAP), a Digital Video Player (DVP), a Digital Video Recorder (DVR), a cellular telephone or other wireless communications device, a personal digital assistant (PDA), or combinations thereof. Furthermore, media receivers 122 and 126 can include a tuner as described above.

Network 128 can comprise a wired and/or a wireless network. In one embodiment, network 128 can include but is not limited to, for example, cable 114, Ethernet, WiFi, a wireless access point (WAP), or any other electronic coupling means, including the Internet 118. It should be appreciated that network 128 can accommodate communication between media server 106, media receivers 122 and 126 and any other coupled device through packet-based communication protocols, such as Transmission Control Protocol (TCP), Internet Protocol (IP), Real-time Transport Protocol (RTP), Real-time Transport Control Protocol (RTCP), and Hypertext Transfer Protocol (HTTP). In one embodiment, communications can be transmitted directly between devices over a LAN, or they may be carried over a wide area network (WAN), for example, the Internet 118.

In one embodiment, as is shown in FIG. 1, one or more video display devices, for example a main TV 120 in a first room (e.g., living room 102), a secondary TV 124 in a second room (e.g., bedroom 104), and a video monitor 112 can be situated at disparate locations in home operating environment 100. These video display devices can be coupled to media server 106 via network 128 either directly or via media receivers 122 and 126.

In one embodiment, main TV 120 and secondary TV 124 can be coupled to media receivers 122 and 126 through conventional cables. In another embodiment, main TV 120 and secondary TV 124 can be coupled to media receivers 122 and 126 via wireless transmissions.

Video monitor 112 can be coupled to media server 106 directly via a video cable or via wireless transmissions. Media server 106 and media receivers 122 and 126 can also or alternatively be coupled to any of a variety of other video and audio presentation devices. Importantly, media content, including TV content, can be supplied to each of the video display devices 112, 120 and 124 over home network 128 from a media server (e.g., 128) that can be situated in a remote room (e.g. living room 102).

Media receivers 122, 126 can be configured to receive streamed media content, including video and TV content, from media server 106. Media content, particularly video and TV content, can be transmitted from the media server 106 to media receivers 122 and 126 as streaming media comprised of discrete content packets via any of the network protocols described above. The streamed media content can comprise video IP, SD, and HD content, including video, audio, and image files, decoded on media receivers 122 and 126 for presentation on the coupled TVs 120 and 124.

The media content can further be "mixed" with additional content, for example, an Electronic Program Guide (EPG), presentation content related to the media content, a web browser window, and other user interface environments transmitted from the media server for presentation on TVs 120 and 124 or monitor 112. Such additional media content can be delivered in a variety of ways using different protocols, including, for example, standard remote desktop protocol (RDP), graphics device interface (GDI), or hypertext markup language (HTML).

In addition to the media receivers 122 and 126 and video display devices 112, 120 and 124, media server 106 can be coupled to other peripheral devices, including components such as digital video recorders (DVR), cable or satellite set-top boxes, speakers, and a printer (not shown for the sake of graphic clarity). Media server 106 can also enable multichannel output for speakers. This can be accomplished through the use of digital interconnect outputs, such as Sony-Philips Digital Interface Format (S/PDIF) or TOSLINK® enabling the delivery of Dolby Digital, Digital Theater Sound (DTS), or Pulse Code Modulation (PCM) surround decoding.

Figure 2:
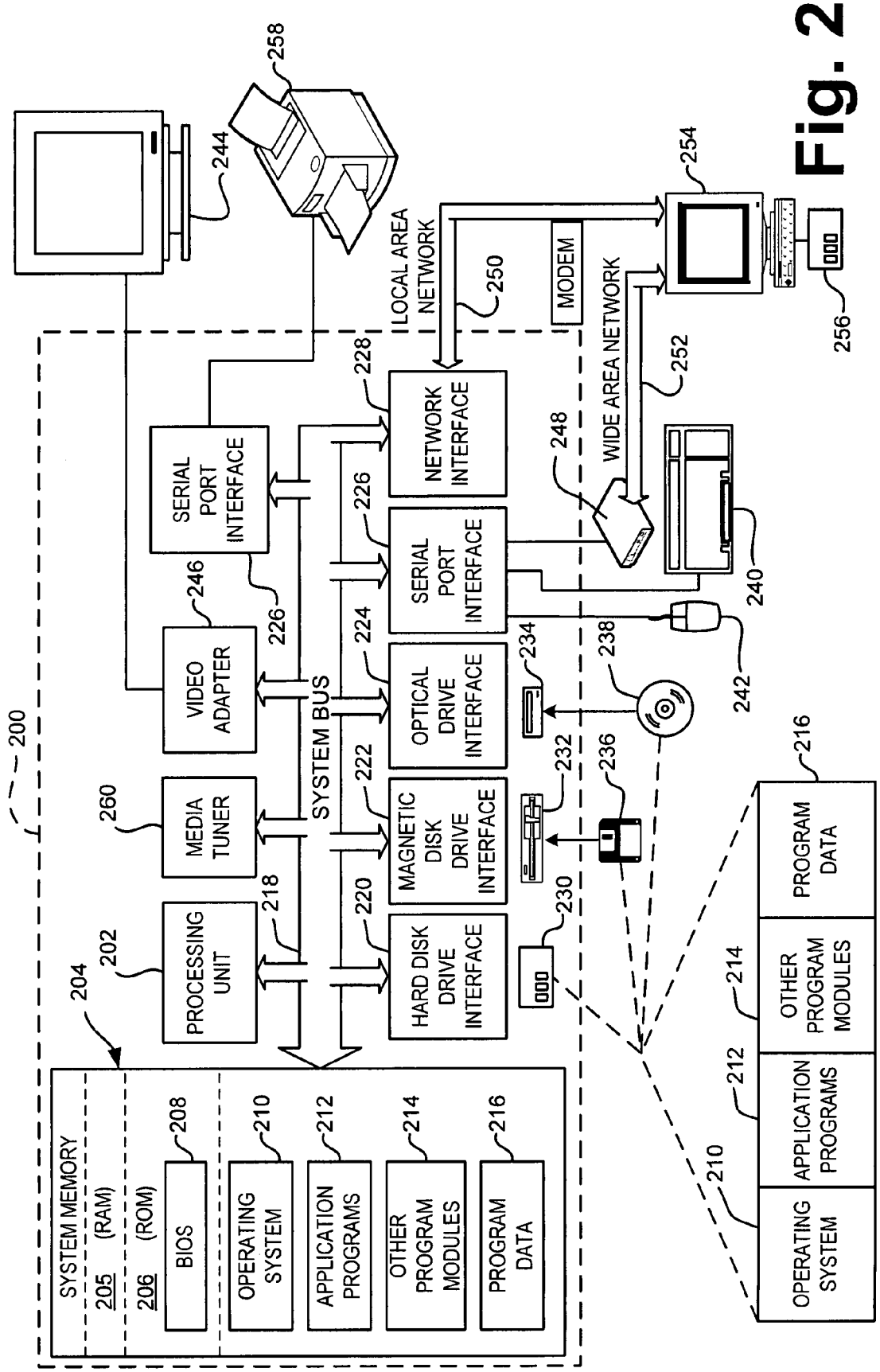
FIG. 2 shows an exemplary hardware operating environment according to one embodiment.

FIG. 2 shows an exemplary hardware operating environment according to one embodiment. As discussed with reference to FIG. 1, media server 106 (shown in FIG. 1), and media receiver devices 122 and 126 (shown in FIG. 1) can comprise general purpose computing devices. Moreover, a general purpose computing device can encompass a computer 200 that includes a processing unit 202, a system memory 204 and a system bus 218 that operatively couples various system components including the system memory 204 to the processing unit 202. In one embodiment, there can be one or more processing units (e.g., 202), such that processing unit 202 can comprise a single central processing unit (CPU), or a plurality of processing units (e.g., a parallel processing environment). In one embodiment, computer 200 may be a conventional computer, a distributed computer, or any other type of computer.

The system bus 218 may be any of several types of bus structures including a memory bus or memory controller, a peripheral bus, a switched fabric, point-to-point connections, and a local bus using any of a variety of bus architectures. The system memory 204 can include read only memory (ROM) 206 and random access memory (RAM) 205. A basic input/output system (BIOS) 208, containing the basic routines that help to transfer information between elements within the computer 200, such as during start-up, can be stored in ROM 206. The computer 200 can further include a hard disk drive 230 for reading from and writing to a hard disk, not shown, a magnetic disk drive 232 for reading from or writing to a removable magnetic disk 236, and an optical disk drive 234 for reading from or writing to a removable optical disk 238 such as a CD ROM, DVD, or other optical media.

As shown in FIG. 2, the hard disk drive 230, magnetic disk drive 232, and optical disk drive 234 can be connected to the system bus 218 by a hard disk drive interface 220, a magnetic disk drive interface 222, and an optical disk drive interface 224, respectively. In one embodiment, the drives and their associated computer-readable media provide nonvolatile storage of computer-readable instructions, data structures, program modules and other data for the computer 200. It should be appreciated by those skilled in the art that any type of computer-readable media that can store data that is accessible by a computer, for example, magnetic cassettes, flash memory cards, digital video disks, RAMs, and ROMs, can be used in the exemplary operating environment shown in FIG. 2.

A number of program modules can be stored on hard disk 230, magnetic disk 236, optical disk 238, ROM 206, or RAM 205, including an operating system 210, one or more application programs 212, (e.g., a multimedia software package) other program modules 214, (e.g., a visualization engine, an audio/video decoder, a UI generator and a metadata decoder) and program data 216 (e.g., media content). Moreover, a user can enter commands and information into the computer 200 through input devices such as a keyboard 240 and a pointing device 242 (e.g., a mouse). Other input devices (not shown) can include but are not limited to a microphone, a remote control, a joystick, a game pad, a tablet, a touch screen device, a satellite dish, a scanner, a facsimile machine, and a video camera. These and other input devices are often connected to processing unit 202 through a serial port interface 226 that is coupled to system bus 218, but can be connected by other interfaces, such as a parallel port, a game port, or a universal serial bus (USB).

A monitor 244 or other type of display device can also be connected to system bus 218 via an interface, such as a video adapter 246. In addition to monitor 244, computers typically include other peripheral output devices, such as a printer (e.g., 258) and speakers (not shown). These and other output devices can be connected to processing unit 202 through a serial port interface 226 that is coupled to system bus 218, but can be connected by other interfaces, such as parallel port, game port, or universal serial bus (USB). In the case of a media server, a tuner 260 can also be connected with system bus 218 in order to receive and convert analog content signals into digital format and similarly convert digital content into analog signals for transmission to connected devices.

Computer 200 can operate in a networked environment using logical connections to one or more remote computers, such as remote computer 254. These logical connections can be achieved by means of a communication device that can be coupled to or integral with computer 200. It should be appreciated that the invention is not limited to a particular type of communications device. Remote computer 254 can be another computer, a server, a router, a network personal computer, a client, a peer device, a media receiver (discussed above), or other common network node, and can include many or all of the elements described above relative to computer 200, although only a memory storage device 256 is illustrated in FIG. 2. It should be appreciated that the logical connections depicted in FIG. 2 can include a wired or wireless local-area network (LAN) 250, for example, an Ethernet network, or a WiFi network, and a wide-area network (WAN) 252, for example, a cable network or a telephony network. Such networking environments are commonplace in office networks, enterprise-wide computer networks, intranets and the Internet, which are all types of networks.

In one embodiment, when employed in a LAN 250 environment, computer 200 can be connected to local network 250 through a network interface or adapter 228, which is a type of communications device. Moreover, when employed in a WAN 252 environment, computer 200 can include a modem 248, a network adapter, or any other type of communications device for establishing communications over the wide area network 252. The modem 248, which can be internal or external, can be connected to the system bus 218 via the serial port interface 226. In a networked environment, program modules depicted relative to the personal computer 200, or portions thereof, can be stored in a remote memory storage device. In the case of a media server, the media server may send and receive content and content requests through LAN 250 and WAN 252. It is appreciated that the network connections shown are exemplary and other means of establishing a communications link between the computers can be used.

Figure 3:
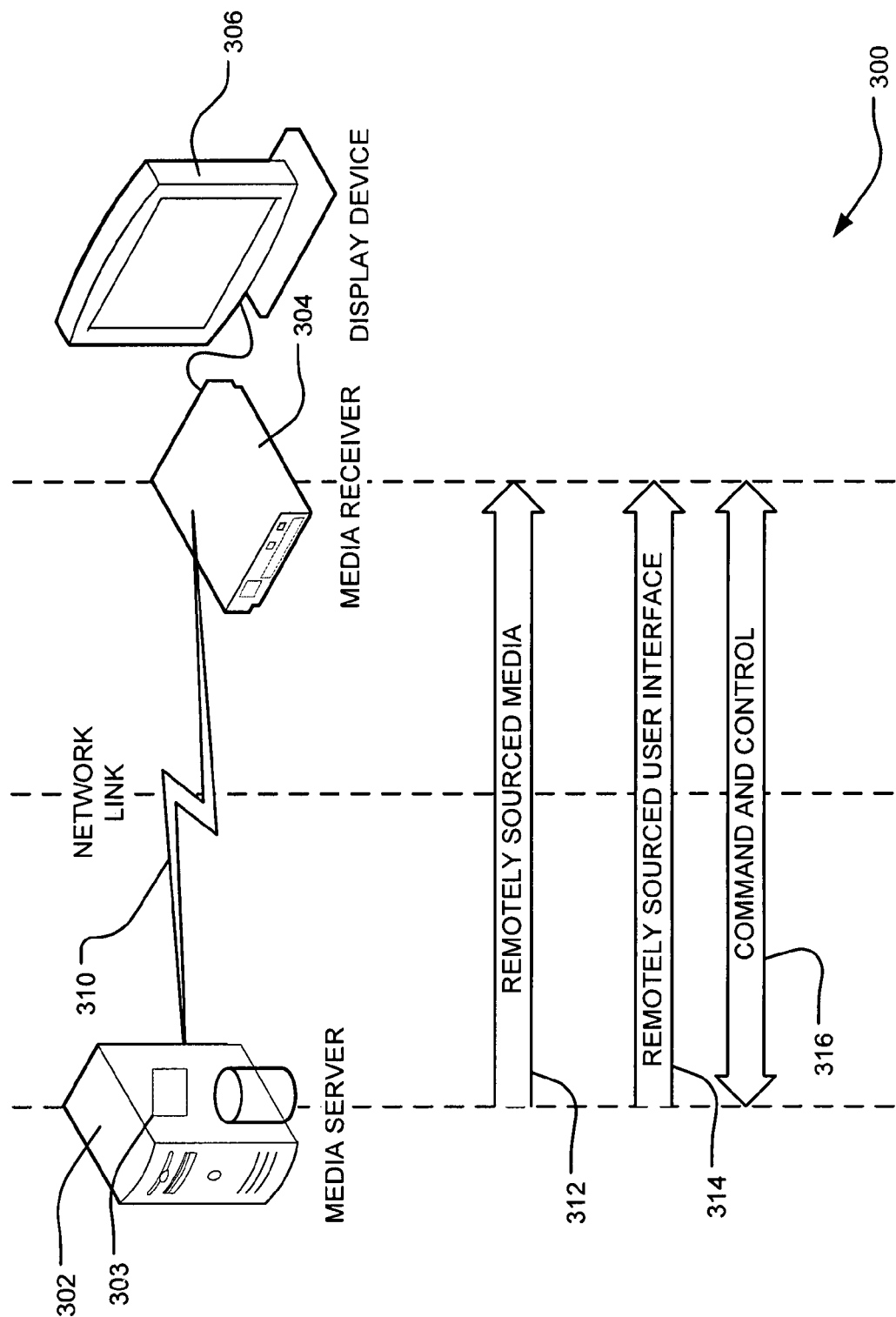
FIG. 3 shows an exemplary network operating environment of a system for playback of dynamic content using file-centric media streaming protocols in accordance with an embodiment.

FIG. 3 shows an exemplary network operating environment 300 of a system 303 for enabling playback of dynamic content using file-centric media streaming protocols in accordance with an embodiment. Exemplary network operating environment 300 may be implemented on the operating environments described above. Exemplary network operating environment 300 includes: media server 302, network link 310, media receiver 304, display device 306, and system 303 for playback of dynamic content using file-centric media streaming protocols.

Media server 302 is an exemplary server as described above as computing system 200 capable of providing and receiving media in a home network environment as discussed above in relation to FIG. 1. Network link 310 allows media server 302 to provide remotely sourced media 312 and optionally remotely sourced user interface 314 to media receiver 304. In one embodiment, one or more pieces of core information (current position, total duration, file name, etc.) are transmitted from the server to the client and the client generates the user interface based upon the core information. Network link 310 further facilitates the command and control 316 between media server 302 and media receiver 304. Network link 310 may use streaming protocols including, but not limited to, Hypertext Transfer Protocol (HTTP) or Real-time Transport Protocol (RTP) to transfer content from media server 302 to media receiver 304. In one embodiment, media server 302 contains system 303 for playback of dynamic content using file-centric media streaming protocols.

System 303 facilitates the playback of dynamic content using file-centric media streaming protocols. In one embodiment, this dynamic content is stored in a dynamic file whose length is growing as the duration of available content is increased. In another embodiment, said dynamic content includes content that is being encoded, transcoded, or otherwise converted from an original file to a converted file while the converted file is being streamed to a device such as media receiver 304. In yet another embodiment, said dynamic content may include content that is being generated on the media server 302 by a TV tuner and/or encoder device. At the beginning of the streaming of the dynamic content the duration is provided for the portion of the content that exists at the time streaming begins. Generally speaking, system 303 supports playback, seeking, and reporting of playback position of dynamic content and is described further herein.

Display device 306 is coupled to media receiver 304 which allows a user to view optionally remotely sourced user interface 314 and remotely sourced media 312. In one embodiment, display device 306 may be a computer monitor or television such as televisions 120 and 124 as discussed above in relation to FIG. 1. Optional remotely sourced user interface 314 may feature large graphical elements such that the user interface may be visible from a distance. Media receiver 304 may receive input from a user through a remote control. Media receiver 304 may handle the user commands directly or partially and pass all or part of the commands to media server 302 via network link 310. Thus, the user may browse and view content on media server 302 on display device 306 via media receiver 304 and network link 310.

Figure 4:
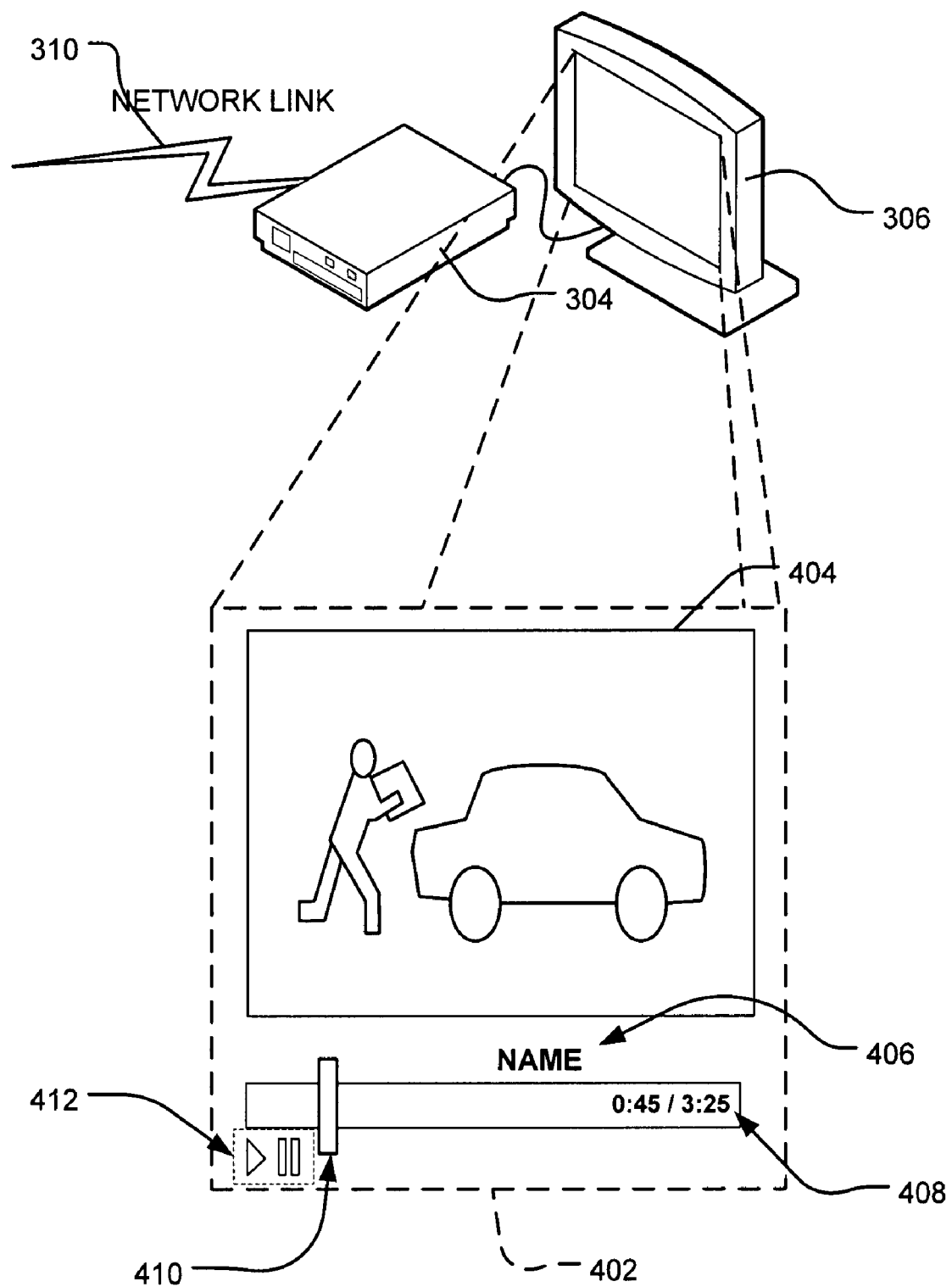
FIG. 4 is a block diagram of an exemplary graphical user interface for displaying media content, in accordance with an embodiment.

FIG. 4 shows an exemplary graphical user interface 402 for displaying media content, in accordance with an embodiment. Graphical user interface 402 is an exemplary remotely sourced user interface 314 as discussed above and is displayed on display device 306. In conjunction with system 303 described above, it can take advantage of the information generated by system 303 to display updated information to the user regarding content duration. Graphical user interface 402 includes: media area 404, media label 406, counter 408, progress bar 410, and playback controls 412.

Media area 404 can display media content stored on another device, such as media server 302, that is accessed through network link 310. Media area 404 may display video or music related information. Media label 406 may display information about the media such as a video or music track name, the production or recordation date, album or television series, etc.

Counter 408 may display the duration and current playback position of a piece of media content. In one embodiment, counter 408 displays both the current playback position and media duration. In another embodiment, counter 408 may display only the current playback position time due to the duration being unavailable or unknown because the file and/or content is dynamic or changing.

In one embodiment, progress bar 410 displays a graphical representation of the current playback position relative to the total duration of the media. In another embodiment, progress bar 410 may not be shown because the duration of the media is unknown or unavailable because the file and/or content is dynamic or changing. Playback control 412 may contain graphical elements corresponding to playback controls available to a user such as play and pause of media content displayed in media content area 404.

Figure 5:
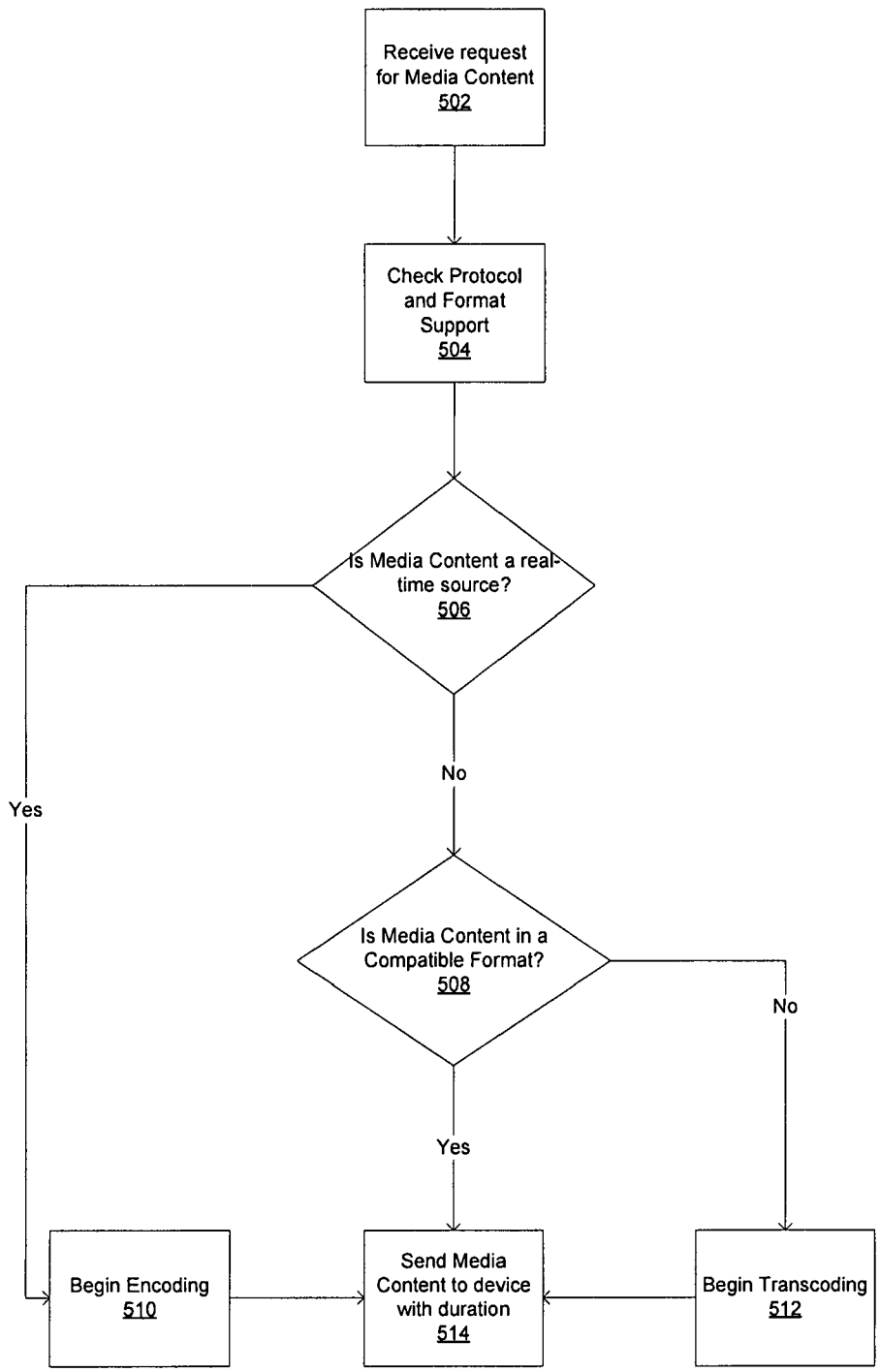
FIG. 5 is a flowchart of a process for processing a media file request, in accordance with an embodiment.

FIG. 5 shows a flowchart of a process 500 for processing a media content request in accordance with an embodiment. Process 500 may be implemented on the operating environments described above. Process 500 is well-suited to be stored as instructions on a computer-readable medium. In an exemplary embodiment, process 500 operates on a media server, such as media server 302 described above. It is appreciated that not all steps of process 500 are necessary for the general goal of process 500 to be achieved. Moreover, it is appreciated that additional steps may also be included in process 500 in accordance with alternative embodiments.

At step 502, in one embodiment a request for media content is received on a media server. Such a request may have been made via a graphical interface on a display device coupled to a media receiver coupled to a network described in above. At step 504, the protocol support and the format support of the receiving device is checked. In one embodiment, when the request is made the device making the request may provide a list of formats and protocols that the requesting device supports.

At step 506, the content is checked to see if it is a source that is being generated in realtime. Real-time sources can include television and cable broadcasts, streaming media, and content in the process of being downloaded. Real-time source content may be stored in a file temporarily before being steamed.

If the content is a real-time source then the media server begins step 510 of transcoding the content into a format compatible with the requesting device. Referring to the above example, the content is encoded in format MPEG-2. In one embodiment, once the encoding process has begun, step 514 may be performed and the content may be streamed to the requesting device while it is being encoded.

If the content is not a real-time source then the media server begins step 508 of checking if the media content is in a format compatible with the requesting device. If the requesting device supports the format of the requested content, step 514 is performed and the content is sent to the requesting device as described below. If the requesting device does not support the format of the requested content, step 512 is performed and the media server begins transcoding the content. Transcoding means that content will be decoded from the current format and re-encoded to a format supported by the requesting device. Referring back to the above example, the content will be decoded from MPEG-4 and re-encoded in MPEG-2 format for playback on the requesting device. In one embodiment, once the transcoding process has begun, step 514 is performed and the content may be streamed to the requesting device while it is being transcoded.

At step 514, the content is sent to the requesting device. In one embodiment, the content is streamed to the requesting device before the encoding or transcoding process has completed. This may be for numerous reasons including the desire to start playback quickly. In one embodiment, the duration of the newly encoded portion of the content is provided to the requesting device as soon as content streaming begins.

Figure 6A:
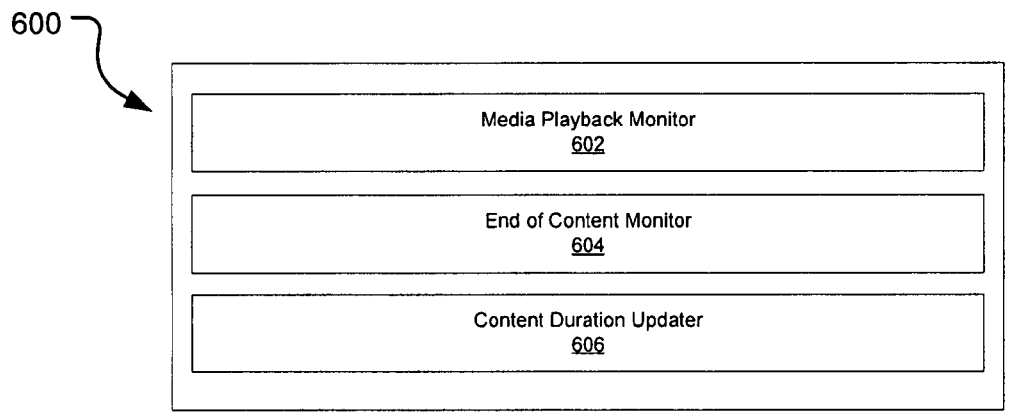
FIG. 6A shows components of a system for playback of dynamic content using file-centric media streaming protocols, in accordance with an embodiment.

FIG. 6A shows components of a system 600 for playback of dynamic content using file-centric media streaming protocols in accordance with one embodiment. In one embodiment, the system 600 allows uninterrupted playback of a content being streamed to a media receiver. In the FIG. 6A embodiment, system 600 includes: media playback monitor 602, end of content monitor 604, and content duration updater 606.

It should be appreciated that aforementioned components of system 600 can be implemented in hardware or software or in a combination of both. In one embodiment, components and operations of system 600 can be encompassed by components and operations of one or more computer programs that execute on a media server (e.g., 302 in FIG. 3). In another embodiment, components and operations of system 600 can be separate from the aforementioned one or more computer programs but can operate cooperatively with components and operations thereof.

Referring to FIG. 6A, media playback monitor 602 monitors various parameters of the current media playback. In one embodiment, media playback monitor 602 detects the playback of dynamic content (which may be stored in a dynamic media file) that is potentially growing in length. The content may be transferred over a network connection using Hypertext Transfer Protocol (HTTP) or Real-time Transport Protocol (RTP). The entire content may not be available because it is still being encoded, transcoded, or downloaded. Nonetheless, the available content may be streamed live (in pace with the most recently available content, before the full content is available) as available, in realtime (or faster) from a media server (e.g. 302 in FIG. 3) in order to start playback quickly, potentially due to limited resources on the receiving device.

In the case of dynamic content being streamed, the duration at the start of playback is the content duration corresponding to the portion of the content that has been encoded or transcoded for playback on the requesting device. For example, the initial duration may be five seconds which is the amount of content that was encoded at the time content streaming began. Thus, the content duration available at the beginning of playback will only be a portion of the content and the total content duration will be available after all of the content is encoded, transcoded, or downloaded.

In another embodiment, if the content duration is growing at a rate less than the playback rate mitigation measures may be performed. Mitigation measures can include reducing the render rate and buffering more of the content before starting playback. Reducing the rendering rate can include reducing the number of video frames per second displayed during the video playback and thus slowing playback. Buffering more of the content before beginning playback increases the time before a subsequent portion of the content will be played. Thus, both measures may allow for the content encoding or transcoding process to catch up to the rate of playback so that normal playback may be resumed.

End of content monitor 604 compares the content duration with the current playback position. In one embodiment, end of content monitor 604 will invoke content duration updater 606 as the playback position approaches the content duration. For example, if the duration provided when streaming began is ten seconds and the current playback position is eight seconds, end of content monitor 604 will invoke content duration updater 606 to see if the duration has increased as more of the content has been encoded. Only if the duration has not increased, then end of stream (EOS) procedures are initiated. This prevents playback from prematurely stopping based on a less than complete duration.

In another embodiment, end of content monitor 604 checks if the content currently being played is content being encoded or transcoded. If the content is being encoded or transcoded, end of content monitor 604 invokes content duration updater 606 as the playback position approaches the content duration, before determining whether to initiate EOS procedures. If the content is not being encoded or transcoded, end of content monitor 604 may instead initiate EOS procedures immediately once the duration is reached to more quickly free up resources on the media receiver such as memory and network connections.

In one embodiment, content duration updater 606 makes a request to the media server for an updated content duration. The content may be in the process of being encoded, transcoded, or downloaded so the previously provided duration for the content corresponds to the portion of the content that had been encoded, transcoded, or downloaded at the point of the previous request. In response to the new request, content duration updater 606 thus gets the updated duration of the portion of the content that has been encoded, transcoded, or downloaded at the time of the new request. Referring to the above example, content duration updater 606 may request the updated duration and receive a reply that the duration is now thirty seconds. Thus, content duration updater 606 updates the duration value used to govern playback behavior and playback parameters such as the graphical user interface.

Figure 6B:
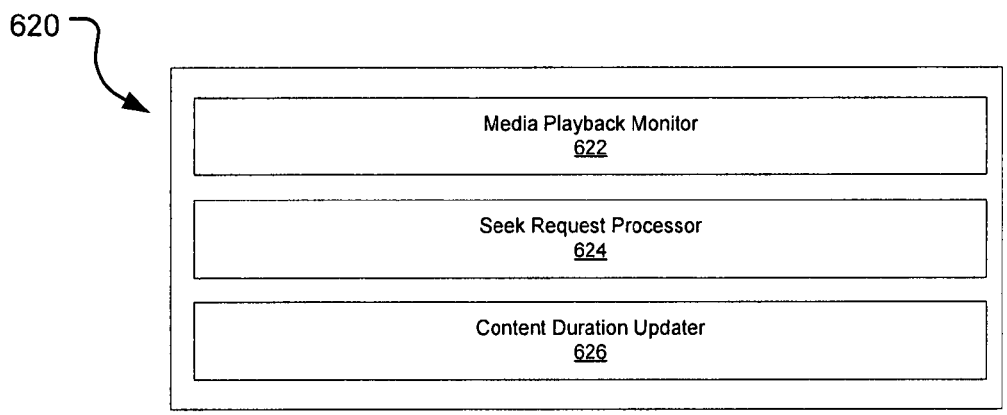
FIG. 6B shows components of a system for playback of dynamic content using file-centric media streaming protocols, in accordance with an embodiment.

FIG. 6B shows components of a system 620 for playback of dynamic content using file-centric media streaming protocols in accordance with one embodiment. In one embodiment, system 620 handles seek requests during playback of dynamic content using file-centric media streaming protocols. System 620 includes: media playback monitor 622, seek request processor 624, and content duration updater 626.

It should be appreciated that aforementioned components of system 620 can be implemented in hardware or software or in a combination of both. In one embodiment, components and operations of system 620 can be encompassed by components and operations of one or more computer programs that execute on a media server (e.g., 302 in FIG. 3). In another embodiment, components and operations of system 620 can be separate from the aforementioned one or more computer programs but can operate cooperatively with components and operations thereof.

Referring to FIG. 6B, media playback monitor 622 monitors various parameters of the current media playback. In one embodiment, media playback monitor 622 detects the playback of dynamic content (which may be stored in a dynamic media file) that is potentially growing in length. The content may be transferred over a network connection using Hypertext Transfer Protocol (HTTP) or Real-time Transport Protocol (RTP). The entire content may not be available because it is still being encoded, transcoded, or downloaded. Nonetheless, the available content may be streamed live (in pace with the most recently available content, before the full content is available) as available, in realtime (or faster) from a media server (e.g. 302 in FIG. 3) in order to start playback quickly, potentially due to limited resources on the receiving device.

In the case of dynamic content being streamed, the content duration at the start of playback is the content duration corresponding to the portion of the content that has been encoded or transcoded for playback on the requesting device. For example, the initial duration may be five seconds which is the amount of content that was encoded at the time file streaming began. Thus, the content duration available at the beginning of playback will only be a portion of the content and the total content duration will not be available until after all of the content is encoded or transcoded.

In another embodiment, if the content duration is growing at a rate less than the playback rate mitigation measures may be performed. Mitigation measures can include reducing the render rate and buffering more of the content before starting playback. Reducing the rendering rate can include reducing the number of video frames per second displayed during the video playback and thus slowing playback. Buffering more of the content before beginning playback increases the time before a subsequent portion of the content will be played. Thus, both measures may allow for the content encoding or transcoding process to catch up to the rate of playback so that normal playback may be resumed.

Seek request processor 624 receives and performs seek requests. In one embodiment, upon receiving a seek request, seek request processor 624 compares the playback position corresponding to the seek request with the currently known content duration. If the seek request is for a playback position less than the content duration, then seek request processor 624 performs the seek request by updating the current playback position to match the seek request. If the seek request is for a playback position beyond the duration of the currently playing media, the seek request processor invokes content duration updater 626 prior to performing the seek. For example, if the initially reported duration was ten seconds at the time content streaming began, when a request to seek to fifteen seconds is received, seek request processor 624 invokes content duration updater 626 prior performing the seek to fifteen seconds.

In one embodiment, content duration updater 626 makes a request to the media server for an updated content duration. The content may be in the process of being encoded, transcoded, or downloaded so the previously provided duration for the content corresponds to the portion of the content that had been encoded, transcoded, or downloaded at the point of the previous request. In response to the new request content duration updater 626 thus gets the updated duration of the portion of the content that has been encoded, transcoded, or downloaded at the time of the new request. Referring to the above example, content duration updater 626 may request the updated duration and receive a reply that the duration is now thirty seconds. Thus, content duration updater 626 updates the duration value used to govern playback behavior and playback parameters such as the graphical user interface.

In one embodiment, if the seek request is less than the updated content duration seek request processor 624 performs the seek request by updating the current playback position to match the seek request. If the seek request is greater than the updated content duration, seek request processor 624 may seek to a position before the updated duration. For example, if a seek request for twenty minutes into a video is received and only fifteen minutes of the content has been encoded, transcoded, or downloaded, the playback position may be updated to fourteen minutes and forty five seconds.

Figure 6C:
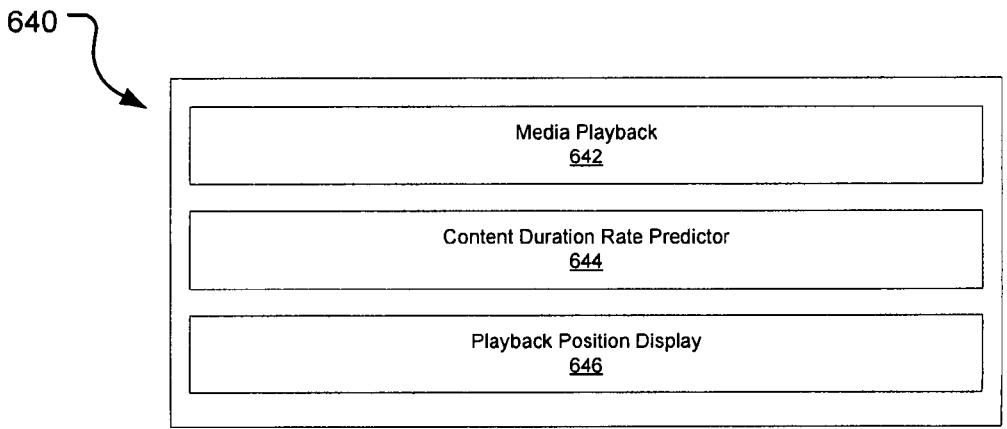
FIG. 6C shows components of a system for playback of dynamic content using file-centric media streaming protocols, in accordance with an embodiment.

FIG. 6C shows components of a system 640 for playback of dynamic content using file-centric media streaming protocols in accordance with one embodiment. In one embodiment, system 640 facilitates the reporting of the playback position of dynamic content in file-centric environments. System 640 includes: media playback monitor 642, content duration rate predictor 644, and playback position display 646.

It should be appreciated that aforementioned components of system 640 can be implemented in hardware or software or in a combination of both. In one embodiment, components and operations of system 640 can be encompassed by components and operations of one or more computer programs that execute on a media server (e.g., 302 in FIG. 3). In another embodiment, components and operations of system 640 can be separate from the aforementioned one or more computer programs but can operate cooperatively with components and operations thereof.

Referring to FIG. 6C, media playback monitor 642 monitors various parameters of the current media playback session/experience. Media playback may be on a media player device as described above. In one embodiment, media playback monitor 642 detects the playback of dynamic content (which may be stored in a dynamic media file) that is potentially growing in length. The content may be transferred over a network connection using Hypertext Transfer Protocol (HTTP) or Real-time Transport Protocol (RTP). The entire content may not be available because it is still being encoded, transcoded, or downloaded. Nonetheless, the available content may be streamed live (in pace with the most recently available content, before the full content is available) as available, in realtime (or faster) from a media server (e.g. 302 in FIG. 3) in order to start playback quickly, potentially due to limited resources on the receiving device.

In the case of dynamic content being streamed, the content duration at the start of playback will be the content duration corresponding to the portion of the content that has been encoded or transcoded for playback on the requesting device. For example, the initial duration may be five seconds which is the amount of the content was encoded at the time content streaming began. Thus, the content duration available at the beginning of playback will only be a portion of the content and the total content duration will not be available until after all of content is encoded or transcoded.

In another embodiment, if the content duration is growing at a rate less than the playback rate mitigation measures may be performed. Mitigation measures can include reducing the render rate and buffering more of the content before starting playback. Reducing the rendering rate can include reducing the number of video frames per second displayed during the video playback and thus slowing playback. Buffering more of the content before beginning playback increases the time before a subsequent portion of the content will be played. Thus, both measures may allow for the content encoding or transcoding process to catch up to the rate of playback so that normal playback may be resumed.

In one embodiment, content duration predictor 644 monitors the rate at which the duration of the content is increasing during various queries to the media server of the current duration, and based on the rate of increase makes predictions about the duration of the content as time progresses, or about the actual duration of the total content. The monitoring of the rate of the content duration increase and the content duration predictions may be implemented by a processor in a device of the above described operating environments. The predictions of the content duration may be used to ensure smooth movement of the progress bar as the duration changes through out media playback. For example, if the playback position was at one minute and the duration reported by the media server was three minutes when the last duration query was performed, and the current playback position is now at one minute and thirty seconds, content duration predictor 644 may estimate the current content duration at four and a half minutes.

Playback position display control 646, among other things, manages the various graphical user interface (GUI) elements that correspond to the current playback position. The various GUI elements may be displayed on the display devices of the operating environments as described above. In one embodiment, the GUI elements can include a progress bar which is a visual representation of the current playback position in relation to the content duration and a counter which indicates the current playback position in time from the beginning of the media content. In another embodiment, a progress bar may not be displayed and only a counter of the current playback position may be displayed when a dynamic content is detected. Playback position display control 646 may update the progress bar based on the content duration from content duration predictor 644. This allows the progress bar to have smoother movement as the content duration changes, as well as provide a more accurate representation of the playback position relative to the overall content duration, and thus provides a better user experience.

Figure 7:
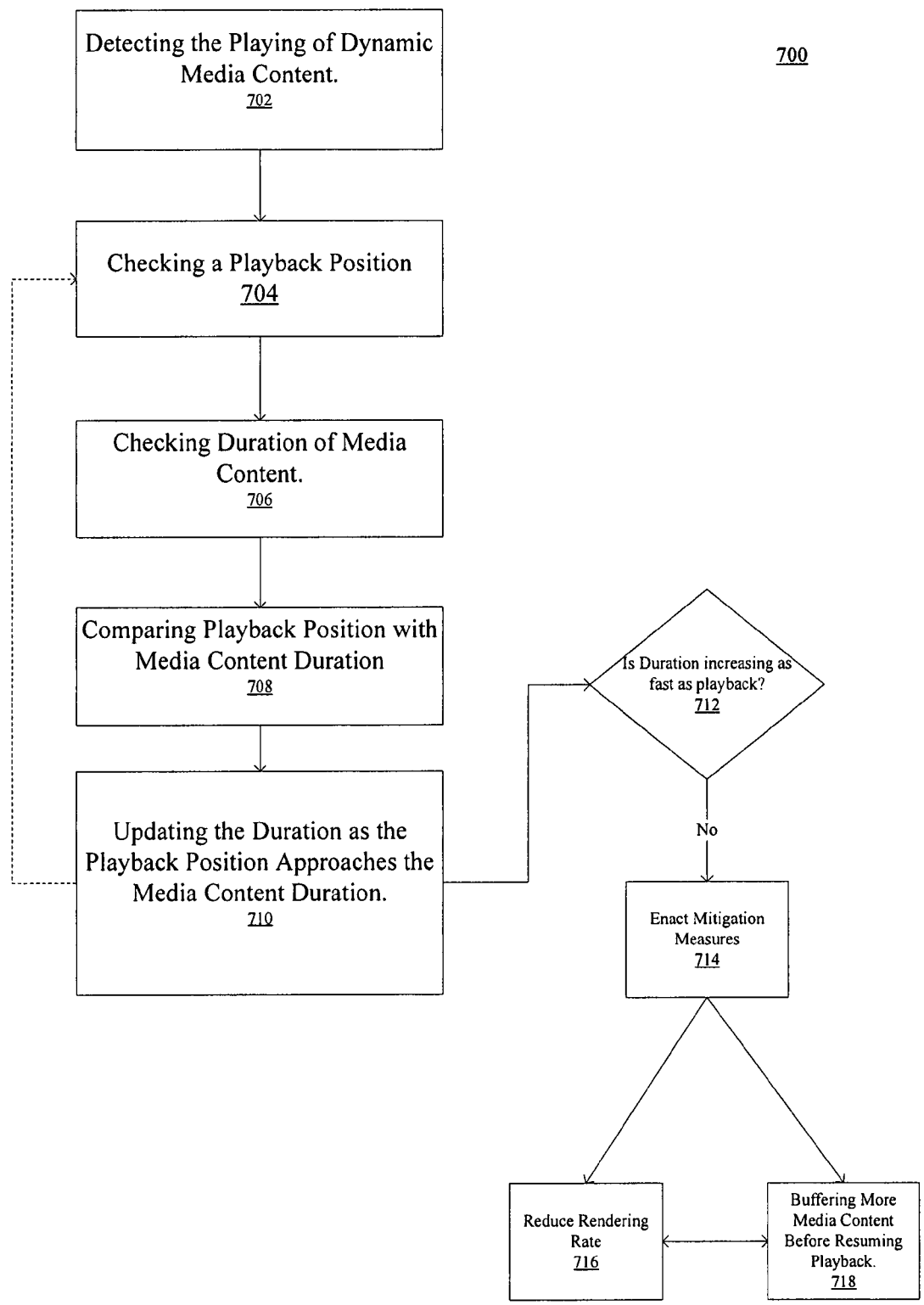
FIG. 7 is a flowchart of a process for performing playback of dynamic content using file-centric media streaming protocols, in accordance with an embodiment.

FIG. 7 is a flowchart of an exemplary process 700 for performing playback of dynamic content (which may be stored in a dynamic media file) using file-centric media streaming protocols, in accordance with an embodiment. Process 700 may be implemented on the operating environments described above. Process 700 is well-suited to be stored as instructions on a computer-readable medium. In an exemplary embodiment, process 700 operates on a media server. It is appreciated that not all steps of process 700 are necessary for the general goal of process 700 to be achieved. Moreover, it is appreciated that additional steps may also be included in process 700 in accordance with alternative embodiments.

At step 702, the playback of media content that is dynamic is detected In one embodiment, the playback may be on a media receiver as described above. The dynamic content (which may be stored in a dynamic file) may be streamed to the media receiver over a network using Hypertext Transfer Protocol (HTTP) or Real-time Transport Protocol (RTP). The media content may be a dynamic file that is being streamed to the media receiver as it is being encoded, transcoded, or downloaded for playback. The full or complete content duration may not be available until the content being streamed has been fully encoded, transcoded, or downloaded.

At step 704, the current playback position of the playing dynamic media content is checked. At step 706, the duration of the playing dynamic media content is checked. In one embodiment, the content duration may be the duration of the portion of the dynamic content that was encoded, transcoded, or downloaded when the content streaming began. The total content duration may only be available after the content is fully encoded, transcoded, or downloaded. For example, the content duration may only be fifteen seconds because that is how much of the content could be encoded, transcoded, or downloaded before the content streaming started.

At step 708, the playback position and the content duration are compared. In one embodiment, the playback position and content duration are compared throughout playback and as long as the playback is a certain threshold of time from the duration, playback continues with no changes to any playback parameters such as content duration.

At step 710, the content duration is updated as the playback position approaches the content duration. The duration may be a previously provided or initially provided duration which corresponds only to the portion of the content that has been encoded, transcoded, or downloaded and thus is not the actual duration of the content being encoded. Thus, the content duration may need to be updated to avoid premature stopping of playback because of reaching a duration that is not the actual duration of the content.

In another embodiment, once the content duration has been updated once, the duration may be updated at regular intervals to ensure there is no premature halting of playback because of reaching a duration that is not the actual or complete content duration.

In another embodiment at step 712, the rate of the duration increase is compared to the playback rate. The result of this comparison indicates whether it is likely that the playback position will reach the duration and playback will have to be stopped while more of the content is encoded, transcoded, or downloaded. This situation may result in a less than desirable user experience because playback of the content may be stopped or may need to be stopped numerous times throughout playback.

At step 714, mitigation measures are enacted to handle the impending problem of the content duration increasing at rate slower than the content is being played back. The mitigation measures can include, step 716, reducing the rendering rate of the content playback. In one embodiment, the video frames per second rate of the video playback may be reduced to slow playback. This may allow for the content duration increase rate to catch up to the rate of playback so that normal playback may be resumed.

At step 718, more of the content may be buffered before resuming playback. The increased buffering may allow a better playback experience because while the increased buffered content data is played, the file encoding, transcoding, or downloading process may catch up or surpass the current playback rate which may prevent further pauses or starvations in video playback. For example, if the current playback buffer is one second then if buffer size were increased to five seconds, during the time the playback buffer data is being played back the content encoding, transcoding, or downloading process continues to encode, transcode, or download the content so playback can continue smoothly.

Figure 8:
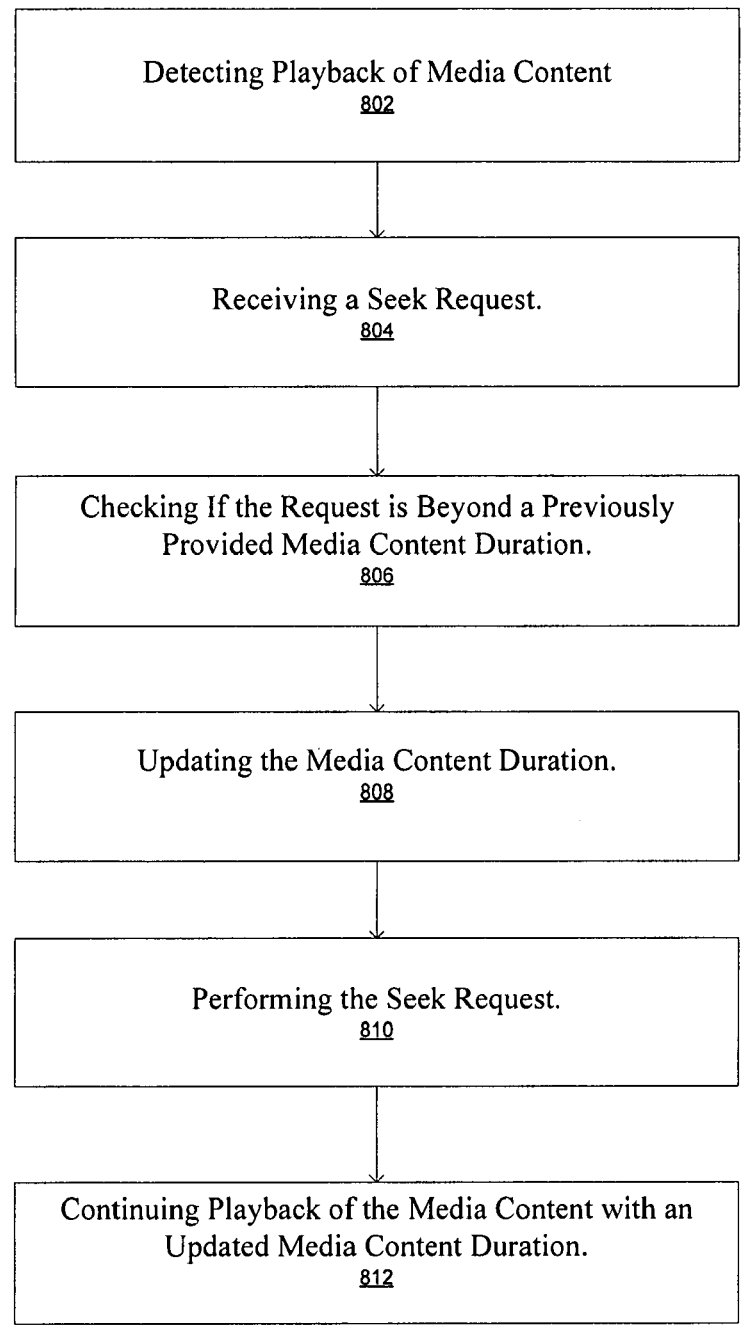
FIG. 8 is a flowchart of a process for performing playback of dynamic content using file-centric media streaming protocols, in accordance with an embodiment.

FIG. 8 is a flowchart of an exemplary process 800 for performing playback of dynamic content using file-centric media streaming protocols, in accordance with an embodiment. Process 800 may be implemented on the operating environments described above. Process 800 is well-suited to be stored as instructions on a computer-readable medium. In an exemplary embodiment, process 800 operates on a media server. It is appreciated that not all steps of process 800 are necessary for the general goal of process 800 to be achieved. Moreover, it is appreciated that additional steps may also be included in process 800 in accordance with alternative embodiments.

At step 802, the playback of dynamic content (which may be stored in a dynamic media file) is detected. In one embodiment, the playback may be on a media receiver as described above. The content may be streamed to the media receiver over a network using Hypertext Transfer Protocol (HTTP) or Real-time Transport Protocol (RTP). The media content may be a dynamic file that is being streamed to the media receiver as it is being encoded, transcoded, or downloaded for playback. The full or complete content duration may not be available until the content being streamed has been fully encoded, transcoded, or downloaded.

At step 804, a seek request is received. A seek request may be a request by a user to jump forward or backward in the currently playing media. If the seek request is a backward request to move to a previously played portion of the content, the seek request may be performed immediately.

At step 806, the seek request is compared to the previously provided content duration. In one embodiment, the content duration will be the duration corresponding to the portion of the content that was encoded, transcoded, or downloaded when the content streaming began or the last time the content duration was updated. For example, the content being encoded, transcoded, or downloaded may be one hour long but at the time streaming began only ten seconds had been encoded, transcoded, or downloaded.

At step 808, the content duration is updated. In one embodiment, the duration will be updated with the duration of the portion of the content that has been encoded, transcoded, or downloaded at the time of the update.

At step 810, the seek request is performed. In one embodiment, if the updated content duration is greater than seek request, the playback position will be set to the position of the seek request. For example, if the previously provided duration was ten minutes and the seek request was for twelve minutes, after updating the duration to fifteen minutes, the seek may be performed and the playback position updated to the requested seek position.

In another embodiment, if the seek request is greater than the updated content duration, the playback position may be updated to a position equal to or just before the playback position corresponding to the duration. For example, if a seek request for twenty minutes into a video is received and only fifteen minutes of the content has been encoded, transcoded, or downloaded, the playback position may be updated to fourteen minutes and forty five seconds.

At step 812, playback of the content is continued with the updated content duration. After the seek request has been performed or the playback position has been updated, playback will continue. In another embodiment, once the content duration has been updated once, content duration may be updated at regular intervals to ensure there is no premature halting of playback because of reaching a duration that is not the actual or complete content duration.

In another embodiment, if the content duration is growing at a rate less than the playback rate, mitigation measures may be performed. Mitigation measures can include reducing the render rate and buffering more of the content before starting playback. Reducing the rendering rate can include reducing the number of video frames per second displayed during the video playback and thus slowing playback. Buffering more of the content before beginning playback increases the time before a subsequent portion of the content will be played. Thus, both measures may allow for the content encoding, transcoding, or downloading process to catch up to the rate of playback so that normal playback may be resumed.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for performing playback of dynamic media content comprising:

receiving a portion of dynamic media content encoded and streamed by a media server at a display device and a content duration of the portion of dynamic media content received at the display device, wherein the portion is encoded by the media server from a format unsupported by the display device into a format supported by the display device and streamed to the display device before all of the dynamic media content has been encoded by the media server;

detecting playback of available dynamic media content by the display device, wherein content duration of the available dynamic media content is initially reported as the content duration of the portion of dynamic media content received at the display device;

receiving increasing available dynamic media content at the display device during the playback as the dynamic media content is encoded and streamed by the media server, wherein the increasing available dynamic media content is received at the display device during the playback at a rate at which the dynamic media content is encoded and made available for streaming to the display device;

checking a current playback position of the available dynamic media content;

determining whether to initiate end of stream procedures by comparing the current playback position of the available dynamic media content with the content duration of the available dynamic media content; and initiating the end of stream procedures only if the content duration of the available dynamic media content has not increased so that the playback of the available dynamic media content by the display device is uninterrupted, wherein the content duration of the available dynamic media content is increased as the playback position approaches the content duration of the available dynamic media content during the playback and is updated based on the increasing available dynamic media content received at the display device during the playback.

2. The method as recited in claim 1 wherein the available dynamic media content received at the display device is stored within a dynamic media file.

3. The method as recited in claim 1 wherein the content duration of the available dynamic media content is updated at regular intervals.

4. The method as recited in claim 1 wherein the dynamic media content encoded by the media server is from a real-time source.

5. The method as recited in claim 4 wherein the dynamic media content encoded by the media server is from a real-time source of television content.

6. The method as recited in claim 1 wherein the dynamic media content is encoded by the media server after being decoded by the media server.

7. The method as recited in claim 1 wherein the dynamic media content is transferred to the display device using a protocol designed for playing fixed-length files.

8. A method for handling seek requests during dynamic media content playback comprising:

receiving a portion of dynamic media content encoded and streamed by a media server at a display device and a content duration of the portion of dynamic media content received at the display device, wherein the portion is encoded by the media server from a format unsupported by the display device into a format supported by the display device and streamed to the display device before all of the dynamic media content has been encoded by the media server;

detecting playback of available dynamic media content by the display device, wherein content duration of the available dynamic media content is initially reported as the content duration of the portion of dynamic media content received at the display device;

receiving increasing available dynamic media content at the display device during the playback as the dynamic media content is encoded and streamed by the media server, wherein the increasing available dynamic media content is received at the display device during the playback at a rate at which the dynamic media content is encoded and made available for streaming to the display device;

receiving a seek request to move to a position beyond the content duration of the available dynamic media content during the playback of the available dynamic media content;

increasing the content duration of the available dynamic media content to an updated content duration based on the increasing available dynamic media content received at the display device during the playback;

performing the seek request; and continuing the playback of the available dynamic media content from an updated playback position based on the updated content duration.

9. The method as recited in claim 8 wherein the available dynamic media content received at the display device is stored within a dynamic media file.

10. The method as recited in claim 8 further comprising:
limiting the updated playback position to be less than or equal to the updated content duration.

11. The method as recited in claim 8 wherein the dynamic media content is streamed by the media server over a communication medium using file-centric media streaming protocols.

12. The method as recited in claim 8 wherein the dynamic media content encoded by the media server is from a real-time source.

13. A system for reporting a dynamic media content playback position comprising:

a media player configured for playback of available dynamic media content, the media player receiving a portion of dynamic media content encoded and streamed by a media server and a content duration of the portion of dynamic media content received at the media player, wherein:

the portion is encoded by the media server from a format unsupported by the media player into a format supported by the media player and streamed to the media player before all of the dynamic media content has been encoded by the media server, content duration of the available dynamic media content is initially reported as the content duration of the portion of dynamic media content received at the media player, the media player receives increasing available dynamic media content during the playback as the dynamic media content is encoded and streamed by the media server, and the increasing available dynamic media content is received at the media player during the playback at a rate at which the dynamic media content is encoded and made available for streaming to the media player;

a processor for checking a current playback position of the available dynamic media content and determining whether to initiate end of service procedures by comparing the current playback position of the available dynamic media content with the content duration of the available dynamic media content, wherein the processor:

determines a predicted content duration based on the rate at which the increasing available dynamic media content is received at the media player during the playback, increases the content duration of the available dynamic media content during the playback to the predicted content duration of the available dynamic media content, updates the content duration of the available dynamic media content from the predicted content based on the increasing available dynamic media content received at media player during the playback, and initiates the end of stream procedures only if the content duration of the available dynamic media content has not increased so that the playback of the available dynamic media content by the media player is uninterrupted; and a display device for displaying the current playback position based on the content duration of the available dynamic media content during the playback of the available dynamic media content.

14. The system of claim 13 wherein the processor enacts mitigation measures if the increasing available dynamic media content is being received at a rate slower than the playback position is advancing.

15. The system of claim 14 wherein the mitigation measures comprise reducing a rendering rate of the available dynamic media content.

16. The system of claim 14 wherein the mitigation measures comprise buffering more of the available dynamic media content prior to starting or restarting playback.

17. The system of claim 13 wherein the available dynamic media content received at the display device is stored within a dynamic media file.

18. The system of claim 13 wherein the display device reports the current playback position by a progress bar and by a counter.

19. The system of claim 13 wherein the display device reports the current playback position only by a counter after the processor has detected the available dynamic media content.

20. The system of claim 13 wherein the dynamic media content is streamed by the media server over a communication medium using file-centric media streaming protocols.

* * * * *